United States Patent
Yao

(10) Patent No.: US 7,157,687 B1
(45) Date of Patent: Jan. 2, 2007

(54) OPTICAL DEVICES WITH FOLDED OPTICAL PATH DESIGNS

(75) Inventor: X. Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 346 days.

(21) Appl. No.: 10/677,809

(22) Filed: Oct. 1, 2003

Related U.S. Application Data

(60) Provisional application No. 60/417,121, filed on Oct. 7, 2002.

(51) Int. Cl.
*G02F 1/01* (2006.01)
*H01J 3/14* (2006.01)

(52) U.S. Cl. ............... 250/216; 250/225; 359/483; 398/152

(58) Field of Classification Search ............... 250/216, 250/225; 359/483, 487, 494, 495, 497, 500; 398/65, 152
See application file for complete search history.

(56) References Cited

U.S. PATENT DOCUMENTS

| | | | | |
|---|---|---|---|---|
| 6,301,046 | B1 * | 10/2001 | Tai et al. | 359/498 |
| 2001/0055154 | A1 * | 12/2001 | Zhao | 359/495 |
| 2002/0163691 | A1 * | 11/2002 | Wong et al. | 359/127 |
| 2003/0026583 | A1 * | 2/2003 | Hoyt et al. | 385/140 |

* cited by examiner

*Primary Examiner*—Stephone B. Allen
(74) *Attorney, Agent, or Firm*—Fish & Richardson P.C.

(57) ABSTRACT

Optical devices with folded optical paths to reduce size of optical devices and optical elements in the optical devices. The folded optical paths operate by manipulating optical polarization of light. Exemplary optical switches and variable optical attenuators are described.

15 Claims, 4 Drawing Sheets

OPTICAL DEVICES WITH FOLDED OPTICAL PATH DESIGNS

This application claims the benefit of U.S. Provisional Application No. 60/417,121 of the same title filed Oct. 7, 2002, the entire disclosure of which is incorporated herein as part of this application.

BACKGROUND

This application relates to optical devices for optical signal manipulation and processing such as optical communication devices or systems.

Some optical devices and systems use an input optical module to receive input light and a separate output optical module to export light. In many of such optical devices and systems, an optical processing module may be used in the optical path between the input and output modules to perform the desired optical manipulation of the light.

SUMMARY

This application includes examples of optical devices for certain optical operations in "folded" optical path designs. Such designs may be used to reduce the number of optical elements in a device and hence the cost of each device. Accordingly, the assembly and alignment of elements in such devices may be simplified. In addition, such designs may advantageously reduce the physical size of devices. In some implementations, the same optical module may be used for both optical input and optical output. The folded optical path designs may be used in optically symmetric devices and in devices that lack optical symmetry.

In one implementation, a device of this application may include an input and output optical module to receive input light and to export output light, an optical processing module, and a reflector. The optical processing module is used to receive the input light from the input and output optical module, and to control polarization of light in processing the input light and directing the output light to the input and output optical module. The reflector is used to receive processed light from the optical processing module and to reflect the processed light back to the optical processing module which further processes the reflected processed light according to polarization to produce the output light. This implementation may have different optical configurations.

For example, the optical processing module may include first and second birefringent beam displacers, first and second half-wave plates, a polarization beam splitter, and a polarization rotator. The first birefringent beam displacer is used to receive and separate first input light from the input and output optical module into two orthogonally polarized beams in first and second polarization directions, respectively. The first half-wave plate is in a path of light in the first polarization direction to or from the first birefringent beam displacer. The second birefringent beam displacer is used to receive and separate second input light from the input and output optical module into two orthogonally polarized beams in the first and the second polarization directions, respectively. The second half-wave plate is in a path of light in the second polarization direction to or from the second birefringent beam displacer. The polarization beam splitter is in optical paths of light beams passing through the first and the second birefringent beam displacers to combine beams from the first and the second birefringent beam displacers into a single beam along a common optical path. The polarization beam splitter also splits light received from the common optical path into orthogonally polarized beams that are received by the first and the second birefringent beam displacers, respectively. The reflector is located at an end of the common optical path to reflect light from the polarization beam splitter back to retrace the common optical path. The polarization rotator is located in the common optical path between the polarization beam splitter and the reflector. The polarization rotator is operable to rotate a polarization of light by 90 degrees for each light beam after being reflected by the reflector.

As another example, the input and output optical module may have a polarization beam splitter which includes a first optical port to receive input light and a second optical port to export output light. The polarization beam splitter splits the input light into two beams with orthogonal polarizations and combines the two beams to produce the output light. In this example, the optical processing module includes an internal reflector operable in combination with the reflector to direct the two beams with orthogonal polarizations to counter propagate with each other before being recombined at the polarization beam splitter. A tunable polarization rotator is also provided in an optical path of the two counter-propagating beams with orthogonal polarizations and is operable to rotate polarizations of the two beams by a common amount in response to a control.

As yet another example, the input and output optical module may include a dual fiber collimator having an input fiber to receive the input light and an output fiber to receive the output light from the optical processing module for export. The optical processing module in this example has a birefringent beam displacer to receive and separate the input light from the input fiber into two orthogonally polarized beams in first and second polarization directions, respectively. The birefringent beam displacer further directs reflected light from the reflector to the output fiber. In addition, the optical processing module includes a tunable polarization rotator between the birefringent beam displacer and the reflector. This tunable polarization rotator is operable to rotate polarization of light traveling between the birefringent beam displacer and the reflector in response to a control.

DETAILED DESCRIPTION

The devices and techniques of this application are in part based on manipulation of optical polarization of light. In particular, 2×2 optical switches and variable optical attenuators are specially designed based on manipulation of optical polarization to have folded optical path configurations and to reduce the number of optical elements and physical size of the apparatus. Hence, the apparatus structure can be simplified and compact. In addition, the cost of the apparatus can be reduced.

Figure 1A:
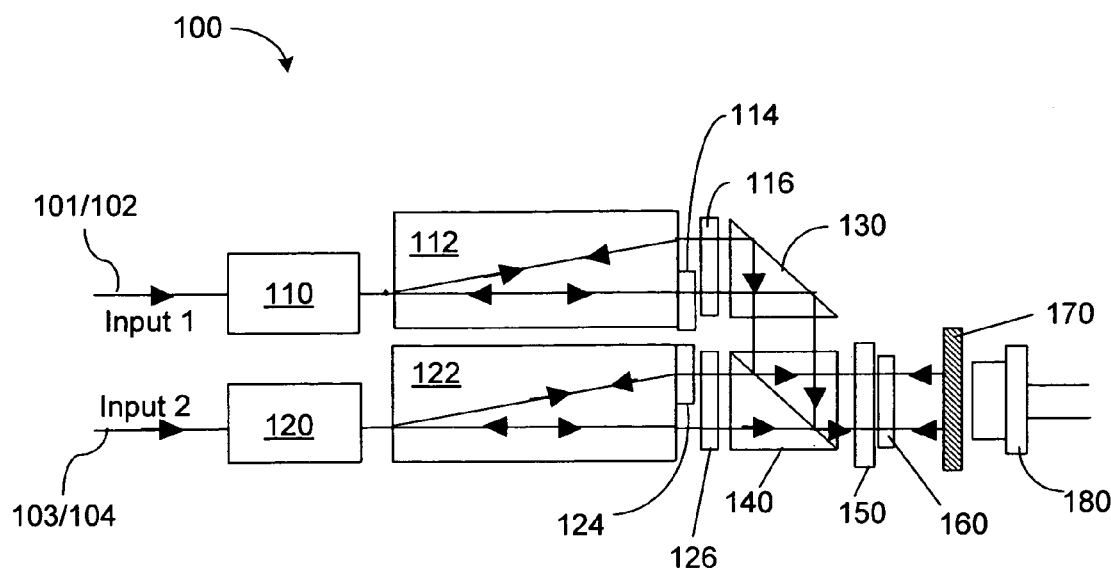
FIGS. 1A and 1B illustrate an exemplary optical switch having a folded optical path design.
Figure 1B:
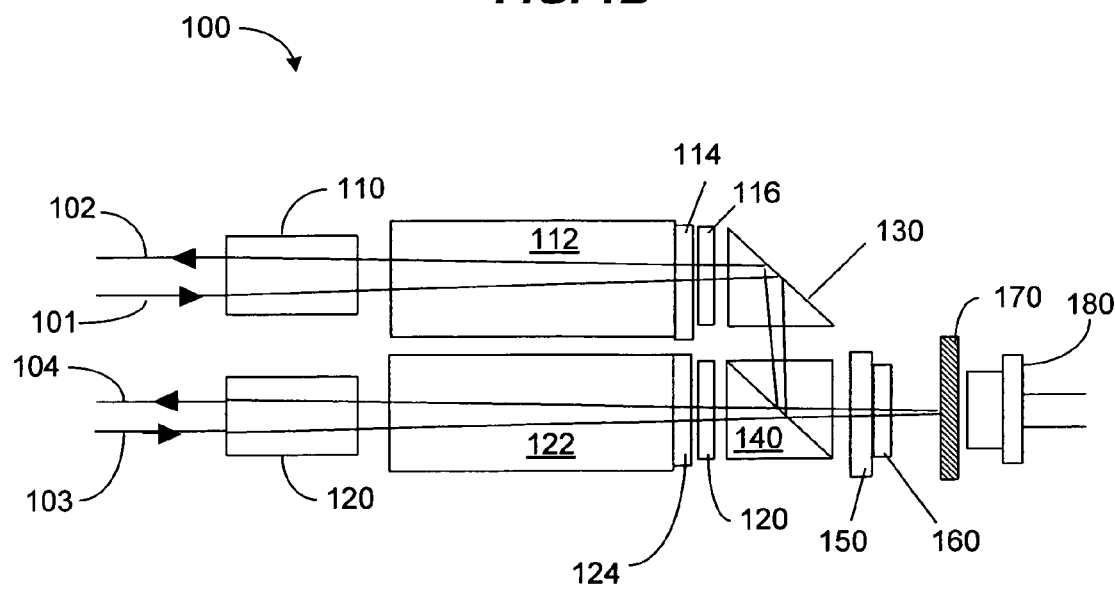

FIGS. 1A and 1B show side views of one embodiment of a 2×2 optical switch 100 based on the folded optical path design from two orthogonal directions. The switch 100 includes two dual fiber collimators 110 and 120. Each collimator 110 or 120 couples to two input/output fibers 101 and 102, or 103 and 104. In each pair of fibers, one fiber is for receiving an optical input and another for exporting an optical output. Referring to FIG. 1B, the fiber 101 coupled to the dual fiber collimator 110 is used as a first input to receive a first input optical signal to be switched and the fiber 102 coupled to the dual fiber collimator 110 in a symmetric geometry with respect to the fiber 102 is used as a first output to output a first output signal. Similarly, the fiber 103 coupled to the dual fiber collimator 120 is used as a second input to receive a second input optical signal to be switched and the fiber 104 coupled to the dual fiber collimator 120 in a symmetric geometry with respect to the fiber 103 is used as an output to output a second output signal.

The switch 100 may be operated in two switching modes. In a first switching mode, the input in the fiber 101 is directed to fiber 102 and the input in the fiber 103 is directed to the fiber 104. In a second switching mode, the input in the fiber 101 is directed to fiber 104 and the input in the fiber 103 is directed to the fiber 102. In addition, the switch 100 is optically symmetric in its structure so that fibers 102 and 104 may be used to receive input signals and fibers 101 and 103 may be used to output signals.

The switch 100 operates based on manipulation of optical polarization of input light. Two birefringent beam displacers 112 and 122 are positioned to receive input light from the collimators 110 and 120, respectively, and to output light to the collimators 110 and 120, respectively. Each birefringent beam displacer includes a birefringent crystal that is cut to separate the optical paths of the two orthogonally polarized components: the ordinary beam and the extraordinary beam. The ordinary beam travels along the input direction within the crystal while the extraordinary beam deviates from the input direction within the crystal so that the ordinary beam and the extraordinary beam exits the crystal at the output facet at two different locations as two separate beams.

Notably, two half-wave plates 114 and 124 are positioned at the output facets of the beam displacers 112 and 122 to rotate polarization of only one of two output beams from each beam displacer by 90 degrees. One half-wave plate rotates the polarization of the ordinary beam output by one beam displacer and another rotates the polarization of the extraordinary beam output by another beam displacer. In the illustrated example, the half-wave plate 114 is placed in the output path of the ordinary beam without intercepting the extraordinary beam, and the half-wave plate 124 is placed in the output path of the extraordinary beam without intercepting the ordinary beam. Hence, after passing through the respective half-wave plate, the two output beams from each beam displacer have the same linear polarization and are effectively a single beam. In particular, this polarization is orthogonal with respect to the polarization of the other output beam formed by the two output beams from the other beam displacer. Two optional linear polarizers 116 and 126, which are orthogonal to each other in their polarization directions, may be used to ensure that polarization of the output beam from the beam displacer 112 is orthogonal to that of the output beam from the beam displacer 122.

A polarization beam splitter (PBS) 140 is also placed in the output paths of the output beams from the beam displacers 112 and 122 to combine the beams to co-propagate in a common optical path. In the illustrated embodiment, the PBS 140 is positioned in the output path of the output beam from the beam displacer 122 to transmit light with the polarization of the beam from the displacer 122. A reflector 130, such as a reflection prism, may be used to direct the output beam from the beam displacer 112 to the PBS 140 which in turn reflects the beam to be parallel to the beam from the beam displacer 122. The beams are then directed to transmit through a polarization rotator 150 to reach a reflector 170. Upon reflection by the reflector 170, the beams are then directed back to the polarization rotator 150 and the PBS 140.

If the polarization rotator 150 does not change the polarization, e.g., it is controlled to operate in this manner, the reflected beams from the reflector 170 would retrace their respective original paths back where the PBS 140 reflects the beam originally from the reflector 130 back to the reflector 130 which directs a portion of the reflected beam through the half-wave plate 114 and the rest directly into the beam displacer 112. The two portions of the beam, now orthogonal to each other in polarization, propagate through crystal to merge on the other side as a single output beam. This beam enters the dual fiber collimator 110 and is directed into the fiber 102 as the output. For the reflected beam originally from the beam displacer 122, the PBS 140 transmits the beam. Hence, the beam reaches the beam displacer 122 with one portion transmitting through the half-wave plate 124 and the rest directly enters the beam displacer 112. These two portions are combined at the other side of the beam displacer 122 as a single beam. The dual fiber collimator 120 directs the beam into the fiber 104.

Alternatively, if the polarization rotator 150 is controlled to rotate the polarization by a total of 90 degrees after the double pass, the operation of the switch 100 is different. The reflected beam originally from the beam displacer 122 will be reflected by the PBS 140 to the reflector 130 and the beam displacer 112. This beam is then collimated by the dual fiber collimator 110 and is coupled into the fiber 102. The beam originally from the reflector 130 and the beam displacer 112, on the other hand, will transmit through the PBS 140 without being reflected due to the total rotation of 90 degrees in its polarization. This beam, with one portion passing through the half-wave plate and another portion going directly into the beam displacer 122, is directed into the fiber 104 by the dual fiber collimator 120. Hence, under this operating condition, the input beam from the fiber 101 is switched into the fiber 104 while the input beam from the fiber 103 being switched into the fiber 102.

Hence, the polarization rotator 150 may be designed as a fixed polarization rotator to produce a total rotation of 90 degrees after a light beam passes it twice after reflection by the reflector 170. For example, the polarization rotator 150 may be a 45-degree Faraday rotator or an optically birefringent element such as a liquid-crystal birefringent cell device (LCD) that rotates the polarization under a control of an electrical control field. In addition, the polarization rotator 150 may be controlled to operate in two different modes: one mode that transmits light without changing its polarization and another mode that produces a rotation of 90 degrees when a beam passes it twice. Hence, a control signal may be used to control the polarization rotator to operate in either of the two modes for optical switching. A liquid-crystal birefringent cell device (LCD) and other suitable polarization devices may be used to achieve these two polarization modes.

Figure 2:
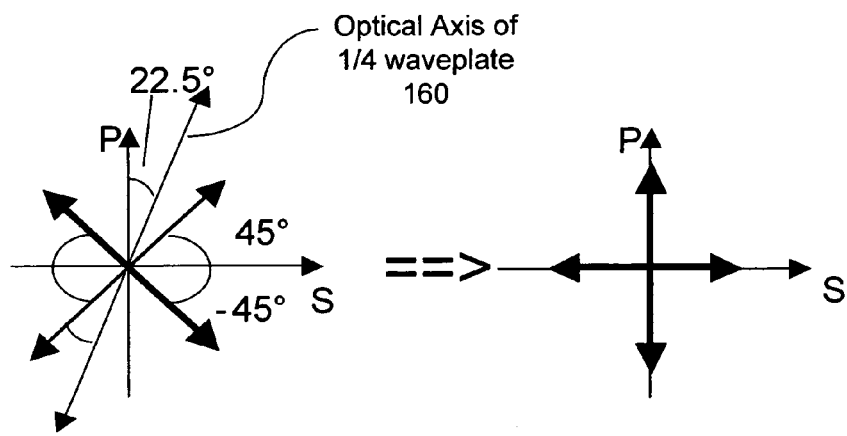
FIG. 2 orientation of a quarter-wave plate used in FIGS. 1A and 1B.

A quarter-wave plate 160 may also be placed in the optical path between the polarization rotator 150 and the reflector 170. As shown in FIG. 2, the orientation of the optic axis of the quarter-wave plate 160 is aligned with respect to the two orthogonal polarizations P and S of the beams from the birefrigent beam displacers 112 and 122 to form an angle of 22.5 degree with the P direction because each beam passes through it twice.

The reflector 170 may be partially transmissive to reflect majority of the incident optical energy back while transmitting a small fraction of the incident optical energy to an optical detector 180 located behind the reflector 170. The optical detector 180 may be used to monitor the optical signals within the switch 100 as a tap monitor to provide information about the signal to be switched. This information may be sent to a switch controller that controls the operation of the switch 100 by controlling the polarization rotator 150.

Figure 3:
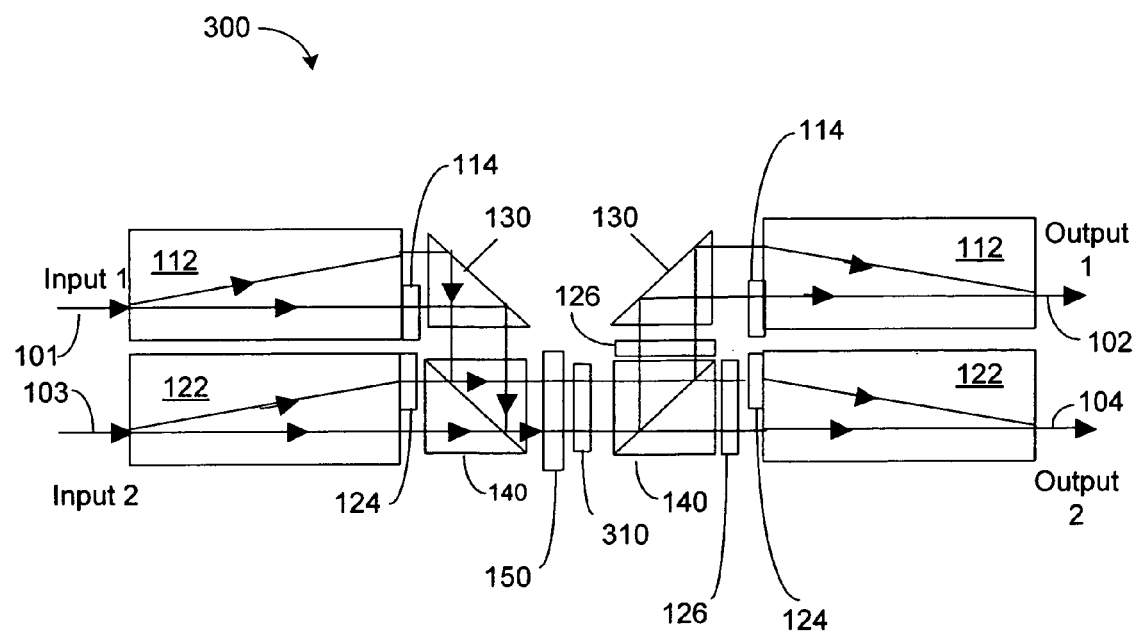
FIG. 3 shows an optical switch with an equivalent switching function to the switch in FIGS. 1A and 1B without the folded optical path design.

The above optical switch 100 is equivalent in its operation to an optical switch 300 in FIG. 3 where the reflector 170 is removed and a symmetric structure as shown in FIGS. 1A and 1B is placed on the other side of the polarization rotator 150. The dual fiber collimators are removed. The fibers 101 and 103 are coupled to the beam displacers 112 and 122 on the left hand side of the polarization rotator, respectively, and the fibers 102 and 104 are coupled to the beam displacers 112 and 122 on the right hand side of the polarization rotator, respectively, to achieve the same two modes of switching operations as in the switch 100 in FIGS. 1A and 1B. An optional half-wave plate 310 may be located between the polarization rotator 150 and the PBS 140 on the right hand side to replace the optional quarter-wave plate 160 in the switch 100 in FIGS. 1A and 1B. The optic axis of the half-wave plate 160 is also aligned to form an angle of 22.5 degree with respect to one of the two orthogonal polarizations received by the PBS 140 on the left hand side of the polarization rotator 150.

In comparison, the switch 100 in FIGS. 1A and 1B is equivalent to a structure that is achieved by folding the structure in FIG. 3 at the right hand side of the polarization rotator 150. Hence, the switch 100 uses the reflector 170 to replace nearly one half of the optical components needed in the switch 300 to achieve a more compact design with reduced cost for manufacturing. In addition, the use of a partial-transmissive reflector 170 and the optical detector 180 allows for easy access to signals to be switched without interfering with the switch operations.

Figure 4A:
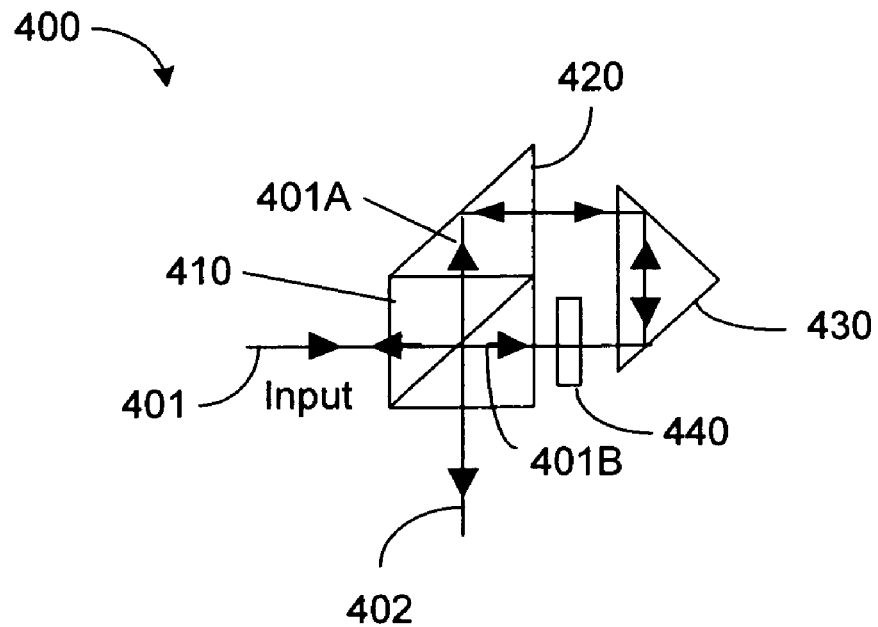
FIG. 4A shows an exemplary variable optical attenuator with a folded optical path design.

FIG. 4A shows a variable optical attenuator (VOA) 400 in a folded optical design. A PBS 410 is used to split the input beam 401 into two orthogonally polarized beams 401A and 401B where the beam 401A is reflected and the beam 401B transmits through the PBS 410. A polarization rotator 440 is placed in either the path of the beam 401A or the path of the beam 401B to change the polarization state of the light passing therethrough. Optical means is used to direct the beam 401A to transmit through the polarization rotator 440 back into the PBS 410 in the opposite direction of the beam 401B and to direct the beam 401B, after passing through the polarization rotator 440 once, back into the PBS 410 in the opposite direction of the beam 401A. In the PBS 410, a portion of the redirected beam 401B with a proper polarization transmits through the PBS 410 to form a part of the output beam 402 and the rest of the redirected beam 401A is reflected in the direction opposite to the input beam 401. Similarly, a portion of the redirected beam 401A with a proper polarization is reflected by the PBS 410 to as another part of the output beam 402 to merge with the transmission of the redirected beam 401B and the rest of the redirected beam 401B transmits through the PBS 410 in the direction opposite to the input beam 401.

Notably, both redirected beams 401A and 401B pass through the polarization rotator 440 once so that the polarization of each redirected beam can be rotated by the same amount and the two orthogonal polarizations in the output beam 402 are attenuated by the same amount in comparison with the input beam 401. Hence, by controlling the polarization rotator 440 to control the amount of rotation in the polarization, the same amount of optical attenuation in each of the two orthogonal polarizations can be achieved. This equal attenuation in both polarizations allows the output beam 401 to retain any polarization-dependent information in the input beam 401. When the polarization rotator 440 is adjustable to produce a variable degree of rotation of polarization in response to a control signal from a control unit, a variable attenuation can be achieved in the output beam 402. The adjustable polarization rotator 440 may be implemented in various configurations, such as an adjustable birefringent optical device (e.g., a liquid crystal cell) and a polarization controller with multiple polarization control elements.

Figure 4B:
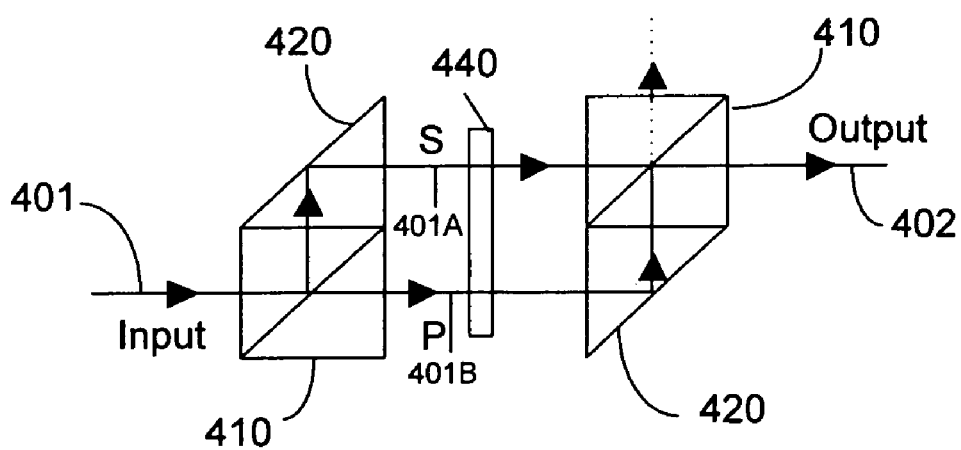
FIG. 4B shows a variable optical attenuator without the folded optical path design in FIG. 4A.

The VOA 400 in FIG. 4A also uses a folded design by using a first reflector 420 such as a reflection prism and a second reflector 430 such as another reflection prism to redirect the beams 401A and 401B. This structure is optically folded when compared to another unfolded VOA shown in FIG. 4B. In FIG. 4B, an additional PBS 410 and a reflector 420 are used in place of the reflector 430. The VOA 400 is compact and has less optical parts.

Figure 5A:
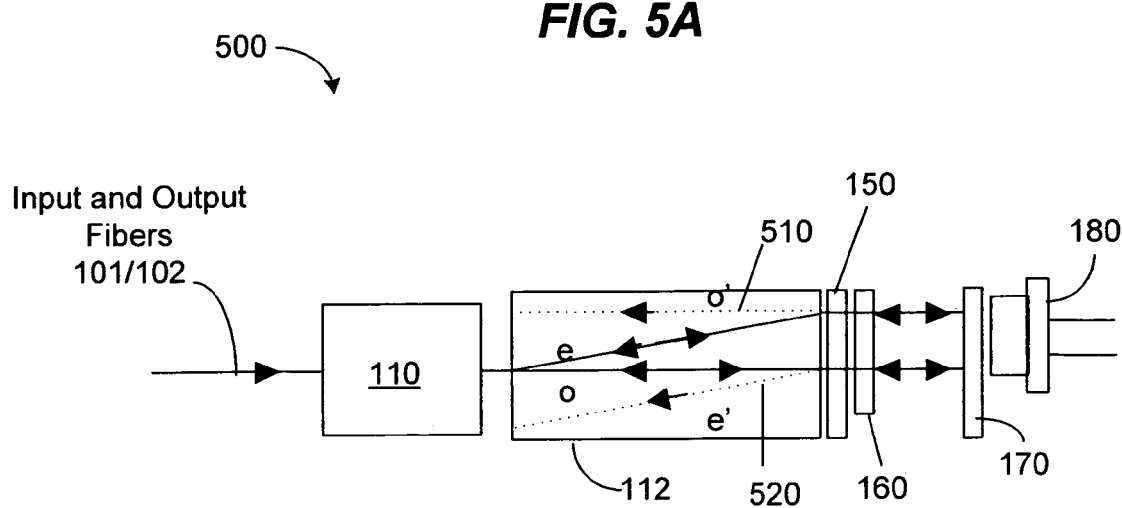
FIGS. 5A and 5B shows another example of a variable optical attenuator with a folded optical path design.
Figure 5B:
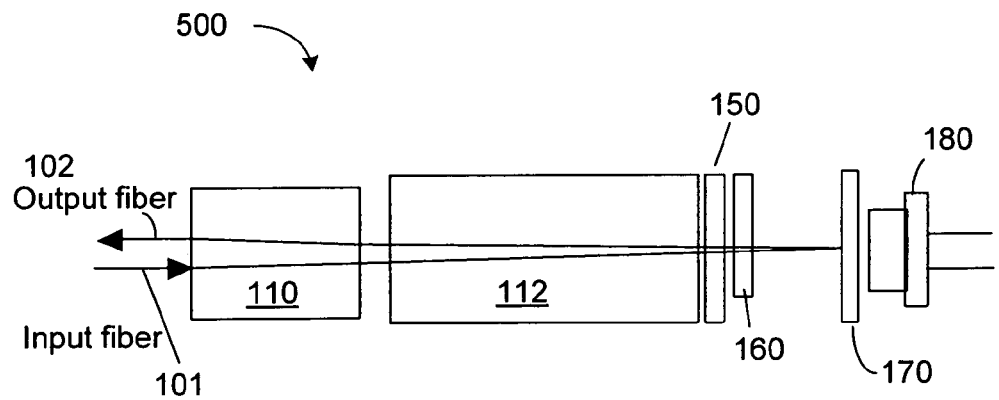
Figure 5C:
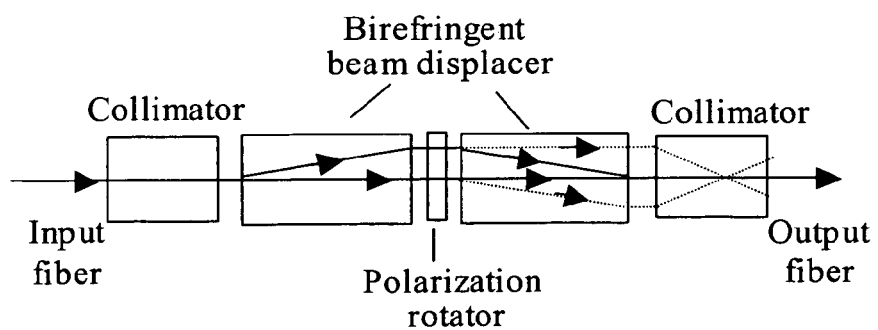
FIG. 5C shows a variable optical attenuator with a similar function to the device in FIGS. 5A and 5B without the folded optical path design.

FIGS. 5A and 5B show another embodiment of a VOA 500 based on a different optical folding design. FIG. 5C shows the functionally equivalent unfolded design that operates based on the same mechanism. Various components in the VOA 500, including the optional quarter-wave plate 160, are also used in the switch 100. A tunable polarization rotator 150 is used to rotate both ordinary and extraordinary beams. Similar to the adjustable polarization rotator 440 shown in FIG. 4A, the polarization rotator 150 in the device 500 is a tunable or adjustable device to produce a variable degree of rotation of polarization in response to a control signal from a control unit for the device 500. The polarization rotator 150 may be implemented in various configurations, such as an adjustable birefringent optical device (e.g., a liquid crystal cell) and a polarization controller with multiple polarization control elements.

In operation of the device 500, the rotation in polarization causes the reflection of the original extraordinary beam to have a portion polarized along the polarization of the ordinary beam and, similarly, the reflection of the original ordinary beam to have a portion polarized along the polarization of the extraordinary beam. Hence, upon reentering the birefringent beam displacer 112 after the reflection at the reflector 170, the portion polarized along the polarization of the ordinary beam in the reflection of the original extraordinary beam becomes a beam 510 to deviate from the original beam path of the original extraordinary beam. This portion will not be coupled into the dual fiber collimator 110 and hence will not be coupled into the output fiber 102. Similarly, upon reentering the birefringent beam displacer 112 after the reflection at the reflector 170, the portion polarized along the polarization of the extraordinary beam in the reflection of the original ordinary beam becomes a beam 520 to deviate from the original beam path of the original ordinary beam. This portion will not be coupled into the dual fiber collimator 110 and hence will not be coupled into the output fiber 102. Hence, the energy in the beams 510 and 520 is lost in the output 102. Notably, both polarizations are equally attenuated in this design to retain the polarization-dependent information in the attenuated output beam.

FIGS. 5A and 5B further illustrate that the reflector 170 may be partially transmisssive to transmit a fraction of light to a photodetector 180 located behind the reflector 170. The output of the detector 180 may be used as a tap monitor signal to monitor the signal in the VOA 500, e.g., monitoring the signal strength to adjust the degree of attenuation based on the measured signal strength by the detector 180. This may be achieved by using the detector signal to control the polarization rotator 150. In this regard, the device 500 is similar to the device 100 in that the folding configuration allows for a convenient implementation of a signal monitoring mechanism by simply making the reflector 170 partially transmisive.

Only a few embodiments are disclosed. However, it is understood that variations and enhancements may be made without departing from the spirit of and are intended to be encompassed by the following claims.

What is claimed is:

1. An optical device, comprising:
   an input and output optical module to receive input light and to export output light;
   an optical processing module to receive the input light from said input and output optical module, and to control polarization of light in processing the input light and directing the output light to said input and output optical module; and
   a reflector to receive processed light from said optical processing module and to reflect the processed light back to said optical processing module which further processes the reflected processed light according to polarization to produce the output light,
   wherein said input and output optical module comprises a first dual fiber collimator having a first pair of fibers with one fiber as a first input and another fiber as a first output, and a second dual fiber collimator having a second pair of fibers with one fiber as a second input and another fiber as a second output.

2. The device as in claim 1, wherein said optical processing module comprises:
   a first birefringent beam displacer placed in optical paths of said first pair of fibers to separate first input light into two orthogonally polarized beams in first and second polarization directions, respectively;
   a first half-wave plate in a path of light in said first polarization direction to or from said first birefringent beam displacer;
   a second birefringent beam displacer placed in optical paths of said first pair of fibers to separate second input light into two orthogonally polarized beams in said first and said second polarization directions, respectively;
   a second half-wave plate in a path of light in said second polarization direction to or from said second birefringent beam displacer;
   a polarization beam splitter in optical paths of light beams passing through said first and said second birefringent beam displacers to combine beams from said first and said second birefringent beam displacers into a single beam along a common optical path and to split light received from said common optical path into orthogonally polarized beams that are received by said first and said second birefringent beam displacers, respectively, wherein said reflector is located at an end of said common optical path to reflect light from said polarization beam splitter back to retrace said common optical path; and
   a polarization rotator located in said common optical path between said polarization beam splitter and said reflector to rotate a polarization of light by 90 degrees for each light beam after being reflected by said reflector.

3. The device as in claim 2, wherein said polarization rotator comprises a Faraday rotator.

4. The device as in claim 2, wherein said polarization rotator comprises a liquid-crystal cell.

5. The device as in claim 2, wherein said polarization rotator comprises an optical birefringent element.

6. The device as in claim 2, wherein said optical processing module further comprises a quarter-wave plate located in said common optical path between said polarization element and said reflector.

7. The device as in claim 6, wherein an optic axis of said quarter-wave plate is at 22.5 degrees with respect to said first and said second polarization directions.

8. The device as in claim 2, wherein said polarization rotator is tunable in response to a control to either produce the rotation of 90 degrees or leave polarization of light unchanged.

9. The device as in claim 2, wherein said reflector is partially transmissive, and wherein said device further comprises an optical detector located to receive transmission of light through said reflector.

10. An optical device, comprising:
    an input and output optical module to receive input light and to export output light;
    an optical processing module to receive the input light from said input and output optical module, and to control polarization of light in processing the input light and directing the output light to said input and output optical module; and
    a reflector to receive processed light from said optical processing module and to reflect the processed light back to said optical processing module which further processes the reflected processed light according to polarization to produce the output light,
    wherein said optical processing module comprises:
    a first birefringent beam displacer to receive and separate first input light from said input and output optical module into two orthogonally polarized beams in first and second polarization directions, respectively;
    a first half-wave plate in a path of light in said first polarization direction to or from said first birefringent beam displacer;
    a second birefringent beam displacer to receive and separate second input light from said input and output optical module into two orthogonally polarized beams in said first and said second polarization directions, respectively;
    a second half-wave plate in a path of light in said second polarization direction to or from said second birefringent beam displacer;
    a polarization beam splitter in optical paths of light beams passing through said first and said second birefringent beam displacers to combine beams from said first and said second birefringent beam displacers into a single beam along a common optical path and to split light received from said common optical path into orthogonally polarized beams that are received by said first and said second birefringent beam displacers, respectively,
    wherein said reflector is located at an end of said common optical path to reflect light from said polarization beam splitter back to retrace said common optical path and is partially transmissive to transmit a fraction of received light as a monitor beam;

a polarization rotator located in said common optical path between said polarization beam splitter and said reflector, said polarization rotator operable to rotate a polarization of light by 90 degrees for each light beam after being reflected by said reflector; and an optical detector positioned relative to said reflector to receive said monitor beam and to produce a monitor signal indicative information in light reflected by said reflector.

11. An optical device, comprising:

an input and output optical module to receive input light and to export output light;

an optical processing module to receive the input light from said input and output optical module, and to control polarization of light in processing the input light and directing the output light to said input and output optical module; and a reflector to receive processed light from said optical processing module and to reflect the processed light back to said optical processing module which further processes the reflected processed light according to polarization to produce the output light, wherein said input and output optical module comprises a polarization beam splitter having a first optical port to receive input light and a second optical port to export output light, said polarization beam splitter splitting the input light into two beams with orthogonal polarizations and combining the two beams to produce the output light, wherein said optical processing module comprises:

an internal reflector operable in combination with said reflector to direct the two beams with orthogonal polarizations to counter propagate with each other before being recombined at said polarization beam splitter, and a tunable polarization rotator in an optical path of the two counter-propagating beams with orthogonal polarizations, said tunable polarization rotator operable to rotate polarizations of the two beams by a common amount in response to a control.

12. An optical device, comprising:

an input and output optical module to receive input light and to export output light;

an optical processing module to receive the input light from said input and output optical module, and to control polarization of light in processing the input light and directing the output light to said input and output optical module; and a reflector to receive processed light from said optical processing module and to reflect the processed light back to said optical processing module which further processes the reflected processed light according to polarization to produce the output light wherein said input and output optical module comprises a dual fiber collimator having an input fiber to receive the input light and an output fiber to receive the output light from said optical processing module for export, and wherein said optical processing module comprises:

a birefringent beam displacer to receive and separate the input light from said input fiber into two orthogonally polarized beams in first and second polarization directions, respectively, wherein said birefringent beam displacer further directs reflected light from said reflector to said output fiber; and a tunable polarization rotator between said birefringent beam displacer and said reflector, said tunable polarization rotator operable to rotate polarization of light traveling between said birefringent beam displacer and said reflector in response to a control.

13. The device as in claim 12, wherein said optical processing module further comprises a quarter-wave plate located between said birefringent beam displacer and said reflector.

14. The device as in claim 12, wherein said reflector is partially transmissive, and wherein said device further comprises an optical detector located to receive transmission of light through said reflector.

15. An optical device, comprising:

an input and output optical module to receive input light and to export output light;

an optical processing module to receive the input light from said input and output optical module, and to control polarization of light in processing the input light and directing the output light to said input and output optical module; and a reflector to receive processed light from said optical processing module and to reflect the processed light back to said optical processing module which further processes the reflected processed light according to polarization to produce the output light, wherein said reflector is partially transmissive, and wherein said device further comprises an optical detector located to receive transmission of light through said reflector.

* * * * *